R. P. BROWN.
METHOD OF AND APPARATUS FOR DETERMINING TRANSFORMATION POINTS.
APPLICATION FILED NOV. 14, 1917.
1,285,920.
Patented Nov. 26, 1918.
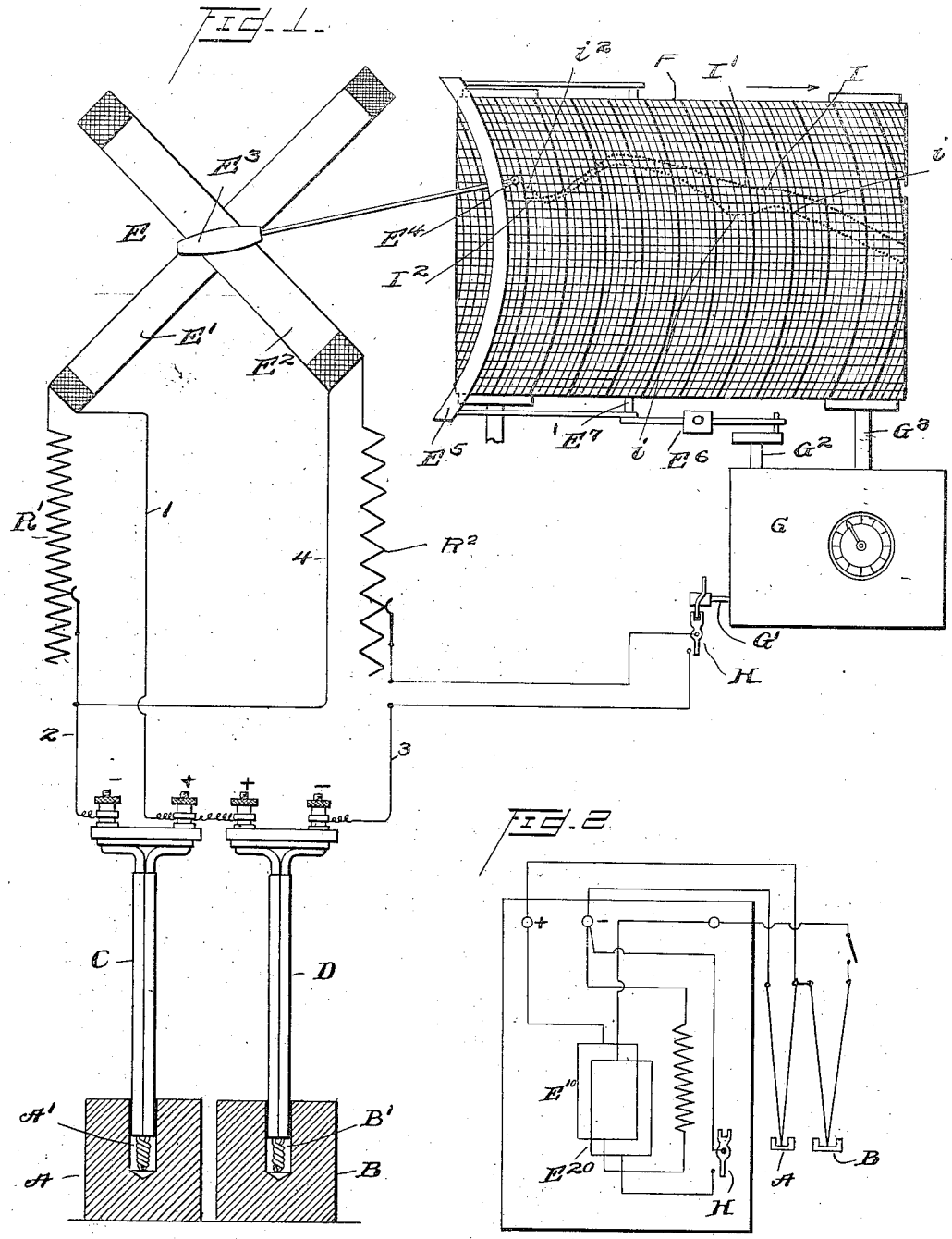
WITNESS
Harold Strauss
Inventor
Richard P. Brown
By Chambers & Hubbell
His Att'ys.

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

METHOD OF AND APPARATUS FOR DETERMINING TRANSFORMATION-POINTS.

1,285,920.   Specification of Letters Patent.   Patented Nov. 26, 1918.

Application filed November 14, 1917. Serial No. 202,030.

*To all whom it may concern:*

Be it known that I, RICHARD P. BROWN, a citizen of the United States of America, and resident of Philadelphia, in the county of Philadelphia and State of Pennsylvania, have invented a certain new and useful Improvement in Methods of and Apparatus for Determining Transformation-Points, of which the following is a true and exact description, reference being had to the accompanying drawings, which form a part hereof.

The object of my present invention is to provide an improved method of, and apparatus for determining so called "transformation points", *i. e.*, the temperature points at which objects or bodies of material absorb or give up heat without appreciable changes in temperature. The accurate determination of "transformation points" is of much practical importance. For example, in the heat treatment of steels the "transformation points" known as the points of "recalescence" and "decalescence" which vary with the composition of the steel are employed to fix, or form a means for determining the best temperatures for annealing and hardening.

My present invention involves the use of, and comprises improvements on, the invention of my prior Patent 1,189,785, granted July 4, 1916. In determining a transformation point in accordance with the present invention, I employ a specimen or test body of the material to be tested and a specimen or neutral body of material having no transformation point, or at least no decided transformation point within the measured temperature range through which the test body is to be carried in locating the sought for transformation point. I simultaneously subject the test and neutral bodies to the same thermal conditions tending to progressively vary their temperatures through the desired range while associating with each body a corresponding electrical device which is subjected to the varying temperature of the body and will exert a current regulating effect responsive to said temperature, and I utilize these electrical devices to impress on the movable element of a single suitable electrical measuring instrument a deflecting force which is a function of the temperature of one of the bodies, preferably the test body, and a second deflecting force which is responsive to the difference in temperatures of the test and neutral bodies. Preferably I employ two thermo-couples inserted, one in the test body and the other in the neutral body, as the electrical devices responsive to the temperature of said bodies, and I connect one of these thermo-couples in a circuit also including one winding of a differential electrical measuring and recording instrument comprising two windings, and I connect the two thermo-couples in a second circuit in which these couples are in series with one another and with the second winding of the instrument, with the thermo-couple so arranged in this second circuit that each bucks the other. The measuring instrument should be so arranged that the change in the deflective force exerted for a given change in the effective electro-motive force or potential difference in the circuit including the second winding is much greater than that resulting from the same variation in the circuit including the first winding. This insures a deflection due to the second winding, as the test body passes through the transformation point, ample for observation purposes. In so far as above described my present invention does not differ from that of my prior patent in so far as it has been described above.

In my prior patent I proposed to continuously maintain the two circuits and thereby continuously subject the movable element of the instrument to the two deflecting forces, one proportional to the temperature of the test body and the other proportional to the temperature differences between the test and neutral bodies. In the use of my present improvement I alternately make and break the circuit containing the two thermo-couples or other electrical devices and thereby subject the movable element of the instrument only to the deflecting force proportional to the temperature of the test body at intervals, and at alternate intervals subject said element to a deflecting force proportional to the difference between the temperatures of the test and neutral bodies. If, as will ordinarily be the case, the electrical measuring instrument employed is a recording instrument, the latter will trace a single curve when used as proposed in my prior patent, while when used in accordance with my present invention, it will trace two curves.

The practical value of my present improvement arises from the difficulty in securing neutral bodies having the same heat absorbing properties as the bodies to be tested. If the test and neutral bodies, with their associated electrical devices have the same heat absorbing properties, except when the test body is passing through a transformation stage, the absolute temperatures of the two bodies will vary at the same rate when subjected to the same thermal conditions, and the two bodies will not appreciably differ in temperature from one another except while the test body is passing through a transformation stage. During such a period the temperature of the test body remains practically constant while the temperature of the neutral body will continue to vary. After the physical change in the test body marking its passage through the transformation stage is completed, the temperature of the test body quickly approaches equality again with that of the neutral body. With such test and neutral bodies and the recording instrument used as proposed in my prior patent, the single curve traced will show the temperature of the test body directly and accurately except during a transformation period, and the break in the curve then occurring will sharply and positively locate the transformation temperature, which, of course, is the temperature indicated by the portions of the curve immediately adjacent the break. But with a neutral body not having the same specific heat or time interval for heating as the test body, the single curve traced in following the practice of my prior patent, while showing sharply and positively the time at which the test body passes through the transformation stage, will not show the transformation temperature with the desired accuracy, an error of 20° F. or so frequently occurring even when considerable care is used in selecting the test body. This error is avoided with the improvement constituting the present invention, which gives on the same record surface, and by means of the same instrument, one curve showing the true temperature of the test body, and a second generally similar curve which differs from the first, however, in that it contains sharp and positive transformation stages. From the second of these curves the tranformation points, or points on the first or temperature curve, may be located just as readily and just as positively as it is on the single curve obtained in following the practice specifically proposed in my prior patent, and in addition the first curve shows the temperature of the test body at each instant with a high degree of accuracy, which, in many cases, is not readily obtainable in practice with the particular procedure suggested in my prior patent.

In the practical carrying out of my present invention I preferably employ an electrical recording instrument in which clock or motor mechanism is provided to advance the record sheet and to bring the marking element carried by the movable element of the instrument proper into contact with the record surface at regular intervals, and also employ clock or motor driven mechanism for making and breaking at regular intervals the circuit, including the two thermo-couples and one winding of the instrument.

In the accompanying drawings:

Figure 1 is a diagrammatic representation of the apparatus which I have devised for carrying out my present invention, and Fig. 2 is a diagrammatic representation of a somewhat different type of electrical measuring instrument practically preferred to that illustrated in Fig. 1.

In the drawings, and referring first to Fig. 1, A represents the test body and B the neutral body, which preferably is similar in shape and size to the test body, and should be of a material having a specific heat as nearly that of the test body as is readily obtainable. For example, if the test body is a carbon steel, the neutral body is advantageously a soft steel free from transformation points. In the similar cavities $A'$ and $B'$, formed for the purpose in the test and neutral bodies A and B respectively, are inserted the hot joints of similar thermo-couples C and D. These thermo-couples should preferably be of the same material, weight and shape so as to have identical heat absorptive, as well as thermo-electric properties.

The terminals of the thermo-couple C are connected by conductors 1 and 2 to the two terminals of the coil $E'$ of a suitable electric recording instrument of the differential type. As diagrammatically shown in Fig. 1, the instrument E is a galvanometer comprising two coils $E'$ and $E^2$ at right angles to one another, and a movable magnet element $E^3$ pivoted to turn about an axis coincident with a diameter of each coil. This instrument may be and is shown as identical with the electrical measuring instrument of my prior patent except for the recording features hereinafter described. One terminal, as shown the positive terminal, of the couple D, is connected to the similar terminal of the couple C, while the negative terminal of the couple D is connected by the conductor 3 to one terminal of the coil $E^2$. The second terminal of the coil $E^2$ is connected by conductor 4 to the conductor 2. The conductor 2 includes between its junction with the conductor 4 and the coil E', a suitable regulating resistance R', and a regulating resistance R² is placed in the conductor 3. As shown, the movable element E³ of the instrument E carries a marking device E⁴, which swings over a recording sheet F, which is slowly fed in the direction of the arrow by the mechanism G. With the preferred recording means illustrated, the marking element normally swings clear of the record sheet and is depressed into contact with the latter at regular intervals by the depressing boom E⁵, which is alternately raised and lowered by the motor mechanism G. The circuit connection 3 includes a switch H, which is alternately opened and closed at regular intervals by the motor mechanism G. As shown, the motor mechanism G comprises a shaft G' for operating the switch H, and shaft G² carrying a crank, which raises and lowers the boom E⁵ through the crank arm E⁶, secured to the rock shaft E⁷, which also carries the boom E⁵. A third shaft G³ of the motor mechanism G is connected to the feed roll for the record sheet F.

With the apparatus illustrated in Fig. 1 two curves, I and $i$, are traced on the recording sheet F as the test and neutral bodies A and B are subjected to thermal conditions carrying the test body through one or more transformation stages. The curve I shows the true temperature of the test body, and the curve $i$, which corresponds generally in its conformation to the curve I, contains breaks or bulges $i'$ and $i^2$ traced during the periods in which the test body is passing through the transformation stages occurring at the temperatures indicated by the portions I' and I², respectively, of the curve I. The particular record illustrated in Fig. 1 is a reproduction of the one actually obtained by the use of my present invention, with a test body of chrome vanadium full high carbon steel and a neutral body of low carbon steel. On this test record the "decalescence" temperature of the test body is indicated at I', and the "recalescence" stage is indicated at I².

The curves I and $i$, with the apparatus disclosed, are made up of a series of dots. In practice, the switch H will ordinarily be opened and closed once for every two depressions of the boom E⁵. This requires, with the particular apparatus diagrammatically illustrated, that the shaft G' should revolve with one-half the speed of the shaft G².

Those skilled in the art will understand that other types of electrical measuring instruments may be employed in lieu of the conventionally illustrated type shown in Fig. 1. In practice, I prefer to use an instrument of the type diagrammatically illustrated in Fig. 2, in which the two windings E¹⁰ and E²⁰ of the instrument are mounted on and carried by the movable element of an instrument of the D'Arsonval type.

While in accordance with the provisions of the statutes I have disclosed the best form of my invention now known to me, it will be apparent to those skilled in the art that changes may be made in the described method of operation, and in the form of the apparatus conventionally illustrated without departing from the spirit of the invention set forth in the annexed claims.

Having now described my invention, what I claim as new and desire to secure by Letters Patent, is:

1. The method of determining the transformation temperature of a test body which consists in simultaneously subjecting said test body and a neutral body to the same thermal conditions to vary their temperatures through a range including the transformation point, utilizing the varying temperatures of the two bodies to maintain an electro potential difference which is a function of the temperature of the test body and a second electro potential difference which is a function of the difference between the temperatures of the two bodies and subjecting the movable element of an electric measuring instrument to a deflecting force due to the first of said potential differences and simultaneously therewith to a second force due to the second of said potential differences at intervals, and at alternate intervals, subjecting said movable element to the first of said deflecting forces alone.

2. The method of determining the transformation temperature of a test body which consists in simultaneously subjecting said body and a neutral body to the same thermal conditions to vary their temperatures through a range including the transformation point, subjecting a thermo-couple to the varying temperature of the test body, continuously subjecting the movable element of a temperature measuring device to a deflecting force which is a function of the potential difference generated in said thermo-couple, subjecting a second thermo-couple to the varying temperature of the neutral body, and intermittently subjecting said movable element to a deflecting force which is a function of the difference between the potential differences created in the two thermo-couples on a variation between the temperatures of the test and neutral bodies.

3. Apparatus for determining the transformation point of the test body from the temperatures of the test body, and a neutral body subjected to the same thermal conditions to vary their temperatures through a range including the transformation point, which comprises in combination with said bodies an electrical measuring instrument of the differential type having a movable element, means responsive to the temperature of the test body for impressing a deflecting force on said movable element which is proportional to the temperature of the test body at intervals, and at alternate intervals impressing on said movable element a deflecting force which is responsive to the difference between the temperatures of the test and neutral bodies.

4. Apparatus for determining the transformation point of the test body from the temperature of the test body and a neutral body subjected to the same thermo conditions to vary their temperature through a range including the transformation point, which comprises in combination with said bodies an electrical measuring instrument of the differential type having two windings and a movable element subjected to a deflecting force by a current flow in either winding, means responsive to the temperature of the test body for impressing an electro-motive force on the terminals of one of said windings which is proportional to the temperature of the test body at intervals, and at alternate intervals impressing on the terminals of the other of said windings an electro-motive force which is responsive to the difference between the temperatures of the test and neutral bodies.

5. Apparatus for determining the transformation point of a test body from the temperatures of the test body and a neutral body subjected to the same thermal conditions to vary their temperatures through a range including the transformation point, which comprises in combination with said bodies, an electrical measuring instrument of the differential type having two windings and a movable element subjected to a deflecting force by a current flow in either winding, and means responsive to the temperatures of the test body for impressing an electro-motive force on the terminals of one of said windings which is a function of the temperature of the test body intermittently actuated, and means responsive to the temperatures of the two bodies for intermittently impressing on the terminals of the other of said windings an electro-motive force which is a function of the difference between the temperatures of the test and neutral bodies.

6. Apparatus for determining the transformation point of a test body from the temperatures of the test body and a neutral body subjected to the same thermal conditions to vary their temperatures through a range including the transformation point, which comprises in combination, a thermo-couple subjected to the temperature of the test body, a second thermo-couple subjected to the temperature of the neutral body, an electrical measuring instrument of the differential type having two windings and a movable element subjected to a deflecting force by a current flow in either winding, and circuit connections establishing one circuit including one of said thermo-couples and one of said windings, and a second circuit in which the two thermo-couples are in series with the other windings and in such relation that each thermo-couple bucks the other, and means for opening and closing the last mentioned circuit at intervals.

7. Apparatus for determining the transformation point of a test body from the temperatures of the test body and a neutral body subjected to the same thermal conditions to vary their temperatures through a range including the transformation point, which comprises in combination with said bodies, an electric recording instrument having a movable element, a marking element adjusted by said movable element, a traveling record surface, means for moving said marking element into operative contact with said record surface at intervals, and means for subjecting said movable element to a deflecting force which is proportional to the temperature of the test body at intervals, and at alternate intervals, to a deflecting force which is a joint function of the temperature of one of said bodies and of the difference in temperature between said bodies.

8. Apparatus for determining the transformation point of a test body from the temperatures of the test body and a neutral body subjected to the same thermal conditions to vary their temperatures through a range including the transformation point, which comprises in combination with said bodies, an electric recording instrument having a movable element, a marking element adjusted by said movable element, a traveling record surface, means for moving said marking element into operative contact with said record surface at intervals, and means for subjecting said movable element to a deflecting force which is proportional to the temperature of the test body at intervals, and at alternate intervals, to a deflecting force which is responsive to the difference in temperature between said bodies.

RICHARD P. BROWN.